Patented Apr. 21, 1936

2,038,465

UNITED STATES PATENT OFFICE 2,038,465

TEMPERATURE MEASURING AND/OR RECORDING APPARATUS

Guido Wünsch, Berlin-Steglitz, Germany, assignor to Askania-Werke Aktiengesellschaft, Berlin-Friedenau, Germany, a corporation of Germany Application September 28, 1931, Serial No. 565,469
In Germany September 30, 1930

8 Claims. (Cl. 73—32)

This invention relates to temperature measuring and/or recording apparatus, and more particularly to electrical apparatus of the character referred to which are intended to measure and/or record only temperatures within a certain predetermined range above or below zero, and in which therefore the apparatus will not begin to measure and/or record temperatures until a temperature is reached near the lowest temperature of the range of temperatures which the apparatus is intended to measure and/or record.

Electrical temperature measuring instruments, such as thermo couples, radiation pyrometers and the like, deliver only quite weak electrical power or impulses, so that their use for measuring and/or recording only temperatures within predetermined ranges, all temperatures between zero and the lowest temperature of the desired range being suppressed, has heretofore been made possible only by the use of complex and inconvenient connections. While therefore radiation pyrometers are used particularly to measure very high temperatures, in blast furnaces and the like for example, where a range of temperatures above a certain limit only is material and therefore the suppression of the measuring of all temperatures below said limit is highly desirable, their use for recording temperatures offers serious difficulties as the weak electrical impulses delivered by the pyrometer are not strong enough to overcome the frictional resistance offered by the recording pencil in sliding over the recording surface. Heretofore it has been attempted to remedy this difficulty by causing the pencil to move over the recording surface while out of contact therewith and pressing the said pencil into contact with said surface at predetermined intervals only. The dotted lines thus produced indicate the course followed by the temperature. Such arrangements, however, have the disadvantage that a period of time must necessarily elapse between successive markings to enable the recording lever or pencil to come definitely to rest in each new position before it is again pressed into contact with the recording surface. Where rapid changes in temperature are to be recorded such apparatus are therefore practically useless.

One of the objects of the present invention is to eliminate this difficulty, this being herein accomplished by not using the impulse or power delivered by the pyrometer or other temperature measuring instrument directly to actuate or move the recording means, said impulse or power being herein used simply to render effective or to control another operating power or impulse of ample strength to operate the temperature measuring and/or recording means. In accordance with the invention also a force, preferably derived from said controlled operating power, acts in opposition to the impulse delivered by the pyrometer. The power actuating the temperature measuring and/or recording means will thus be proportional to the impulse or power delivered by the pyrometer. In order to suppress all measuring or recording of temperatures before the beginning of the range of temperatures which it is desired to measure and/or record is reached, another force will be caused to act in opposition to the impulse or power derived from the pyrometer, which force must be overcome before the instrument will begin to measure and/or record temperature.

Other objects of the invention will appear in the course of the following description.

The invention and its objects and aims will be readily understood from the following description, taken in connection with the accompanying drawings of one illustrative embodiment of the invention, the true scope of the invention being more particularly pointed out in the appended claims.

Figure 1:
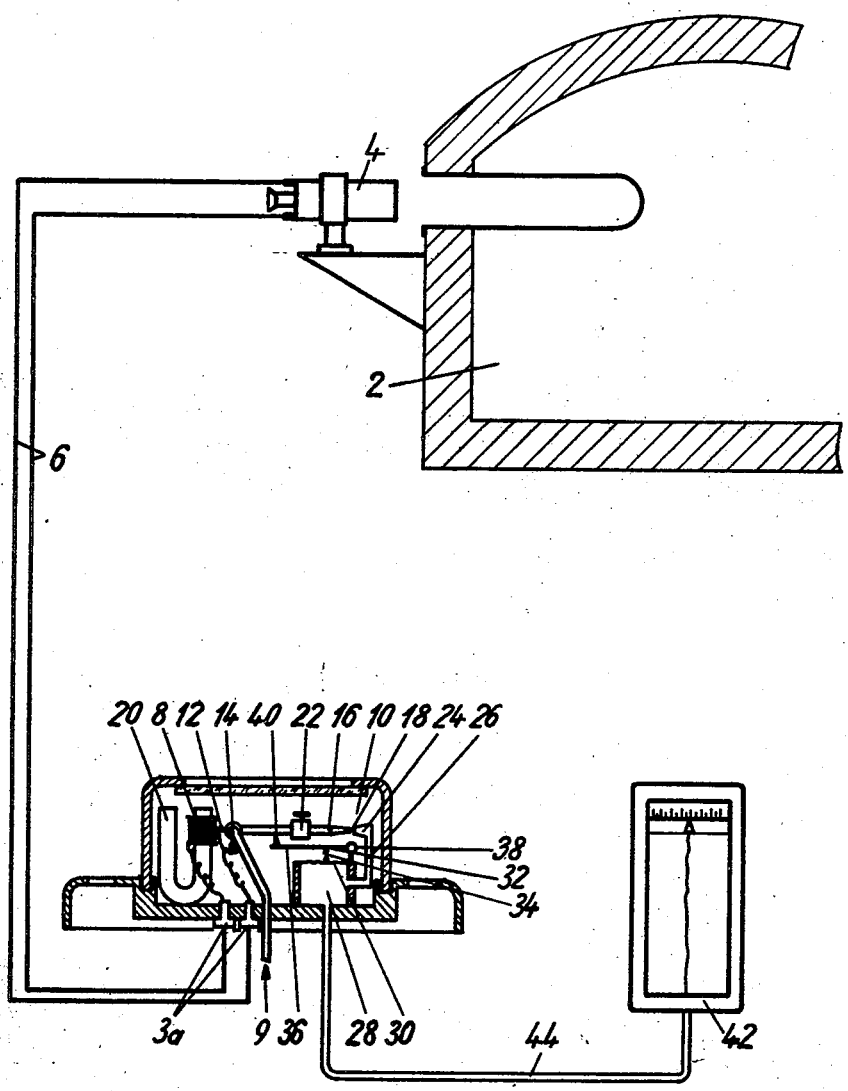
Fig. 1 is a sectional elevation, partly diagrammatic, of one illustrative embodiment of the invention.

Referring to Fig. 1, temperature responsive power-delivery means, herein a pyrometer, of conventional construction is shown at 4, said pyrometer being suitably installed with relation to a furnace or fire-box 2 wherein the temperature is to be measured and/or recorded. Said pyrometer is electrically connected by conductors 6 with controlling means comprising a coil 8 of a current balance 10, constituting an automatic proportioning governor which may be termed an automatic power relay. Said coil is secured to one arm of a two-armed lever 12 fulcrumed upon a knife edge 14, the other arm of said lever carrying a pressure fluid jet nozzle 16 having a discharge opening 18. Said nozzle 16 is supplied with pressure fluid, such as air under constant pressure, from any suitable source of supply (not shown) and constitutes power supplying means controlled by impulses or power delivered by the pyrometer acting upon said controlling means.

The coil 8 plays over one of the poles of a steel magnet 20 as in drag-galvanometers for example. Said jet nozzle 16 carries a weight 22 slidable for adjustment longitudinally of said nozzle and adapted to be held in adjusted position by a set screw. The adjustable weight on the nozzle constitutes illustrative means to regulate the governor or power relay mechanism so that it will respond to current impulses of a predetermined strength. In other words, the position of the weight will determine the temperature range within which the device is to operate. In practice, the weight is adjusted on the nozzle so that the nozzle does not quite balance the weight of the arm 12 and the attached coil 8. Movement of the lever 12 upon the knife edge 14 causes the discharge opening 18 of said jet nozzle 16 to play in front of a port 24 provided in a pipe 26 leading to fluid pressure responsive means, formed by a diaphragm chamber 28 in the illustrative embodiment of the invention shown. Said diaphragm chamber is provided with a diaphragm 30 which closes one side thereof and carries a link or other suitable member 32, preferably terminating in a knife edge 34 which contacts with a lever 36 having one end fulcrumed at 38 and its other end contacting with the nozzle arm of lever 12, preferably through a knife edge 40. The fluid pressure in the diaphragm chamber 28, which corresponds to that part of the pressure fluid jet delivered by the nozzle 16 to the port 24 of pipe 26, besides operating a measuring and/or recording instrument 42, through pipe 44, tends through the diaphragm 30, link 32 and lever 36 to oppose the action of the electrical impulses delivered by the pyrometer 4 and acting on said nozzle. Said measuring and/or recording instrument may be of any suitable conventional construction and need not be more fully described. From the above description it will be apparent that the lever 12, responsive to the action of said electrical impulses or measuring values, modified by the action of the counterweight 22 for the magnet coil and the pressure in the diaphragm chamber 28, assumes a balanced position in which to every definite electrical measuring value, i. e. to every perfectly definite irradiation of the pyrometer 4, and therefore to every perfectly definite temperature within the fire pot or furnace 2 there corresponds a perfectly definite pressure within the diaphragm chamber 28. The temperature in the fire box 2 can therefore be measured by the fluid pressure in the diaphragm chamber 28 and recorded by said fluid pressure operated recording instrument 42, calibrated and scaled to record temperature direct.

As hereinbefore explained, the weight 22 is used to adjust the mechanism so that the electrical impulses have to overcome a definite or predetermined force before the nozzle 18 is brought opposite the port 24. In practice, the weight of the arm 12 plus the weight of the attached coil 8 exceeds the weight of the jet pipe 16 with the weight 22 adjusted thereon. The excess weight of said coil and arm exerts a force which is opposed by the force exerted by the magnet 20 upon the coil. Therefore, the weight 22 can be so adjusted on the jet pipe that the temperature indications or impulses arising from the changes in temperature will not function until a predetermined temperature has been reached.

When the current delivered by the pyrometer 4 flows through the coil 8, said coil, as the result of the magneto electric action upon the magnet 20, tends to turn the lever 12 with the jet nozzle 16 clockwise. If the pyrometer is not energized so that no current flows through the coil 8, the left arm of the lever 12 drops as a result of the excess weight of said coil. The lever 12 is thus moved contra-clockwise, the opening of the jet nozzle 16 is above the port 24, so that no fluid pressure enters the latter. The diaphragm 30 thus also does not act on said jet nozzle. When the pyrometer, however, is energized, and current flows through the coil 8, the latter will move the lever 12 clockwise and if the current becomes so strong, that is to say, if the temperature acting on the pyrometer 4 rises high enough so that the magneto electric action on the coil 8 overcomes the excess weight of the left arm of said lever, said lever will be turned clockwise, the opening of the jet nozzle registers more or less with said intake port, and fluid pressure enters the latter. The more the lever 12 turns clockwise the more fluid pressure enters said port. So soon, however, as fluid pressure enters said port, a pressure will be created in the diaphragm chamber 28, said pressure increasing as more fluid pressure enters said chamber. This pressure in said diaphragm chamber acting through the diaphragm, lever 34, etc. tends to turn the lever 12 contra-clockwise, that is to say, against the action of the coil 8. So soon, therefore, as the pyrometer is energized and current flows through the coil 8, two forces act upon said lever 12, namely the force created by the electric current which tends to turn said lever clockwise and the other force due to the pressure in the diaphragm chamber 28 tending to turn said lever contra-clockwise, this latter force thus tending to diminish the amount of fluid pressure entering said diaphragm chamber and therefore the pressure in the diaphragm chamber 28. As a result the jet nozzle is obliged to assume a state of equilibrium or balanced position, wherein the action of the pyrometer current on the coil 8 balances the action of the pressure in the diaphragm chamber 28. If the pyrometer current drops for any reason the magneto electric action on the coil 8 becomes weaker, so that the pressure exerted from the chamber 28 upon the lever 12 exceeds the action of said coil and tends to turn said lever contra-clockwise and bring the opening of the nozzle 16 more out of coincidence with said intake port. This produces immediately a drop of pressure in said diaphragm chamber, so that a new state of equilibrium as regards said nozzle is created in which the diminished pressure in the chamber 28 balances the also diminished magneto electric action of the coil 8. The opposite result occurs when the temperature acting on the pyrometer rises and thereby the current flowing through the coil 8 is increased in intensity. It will thus be seen that under all conditions and circumstances the pressure in the chamber 28 will be proportionally equal to the variations in temperature to be measured. This is the object of the opposed action described.

Figure 2:
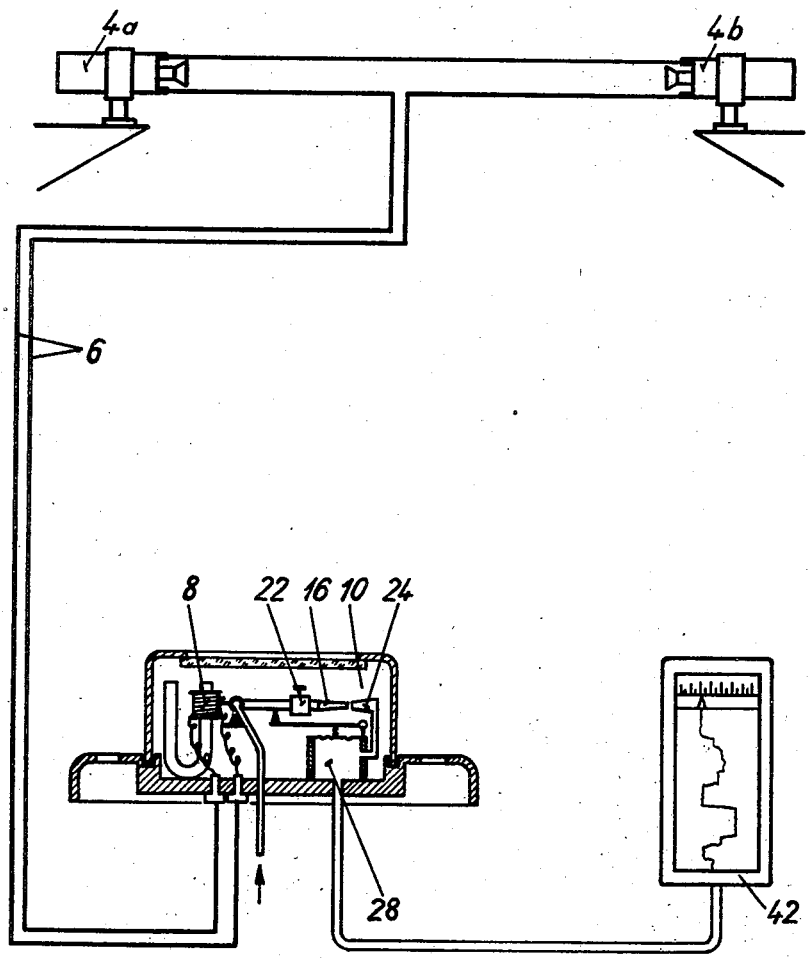
Fig. 2 is a sectional elevation partly diagrammatic of an illustrative embodiment of the invention in its application to recording differences in temperature.

The invention can also be applied to advantage for indicating or recording differences in temperature by sign (+ or −) and degree. For this purpose it is only necessary to allow two heat responsive power delivery means, two radiation pyrometers for example, acting in opposition, to act as illustrated in Fig. 2 in place of the single pyrometer as illustrated in Fig. 1. The force necessary to be balanced before the measuring and recording means shall become operative, will then preferably be so adjusted that the pressure fluid intake port shall receive substantially half the pressure fluid delivered from the jet nozzle, when both temperature responsive means, that is to say both pyrometers, are subjected to the same temperature, so that the difference in temperature equals zero. The quantity of pressure fluid delivered by said nozzle to said intake port will be increased or diminished according to the direction of the resulting current, that is to say according as the one or the other temperature is higher. The recording or writing apparatus will be so arranged and calibrated that a central line will be recorded when said intake port receives half the pressure fluid jet from said nozzle. From the markings made by the measuring and/or recording instrument the course of the temperature difference can thus be followed by sign and degree, as will readily be understood by those skilled in the art.

Referring more in detail to Fig. 2, the temperatures, the difference of which is to be recorded or measured act respectively upon two pyrometers 4a, 4b which are connected in opposition to the conductors 6. The difference in the intensity of current delivered by the two pyrometers respectively therefore acts upon the coil of the current balance 10, which may and preferably will be constructed and arranged like that in Fig. 1. If the temperature difference equals zero, the action of the two pyrometers is nullified and the coil receives no current. The weight will preferably be so adjusted upon the nozzle 16 that when the port 24 receives half the jet from said nozzle, the counter pressure in the diaphragm chamber 28 just overcomes the action of said weight upon the nozzle 16. According as the pyrometer 4a or the pyrometer 4b is subjected to the higher temperature, that is to say, according as the difference in temperature is positive or negative, a current in the one or the other direction will act on the coil 8 and consequently a force or power tending to turn the nozzle in the one or the other direction relative to the pressure fluid intake port 24 will act upon said nozzle and the pressure in the diaphragm chamber 28 will either rise or fall. The pressure responsive writer 42 will be so calibrated and scaled that when the actions of the two pyrometers neutralize each other and consequently a medium pressure exists in the diaphragm chamber 28, a central line will be recorded by said instrument 42. Deviations of the line recorded by said instrument toward one side or the other will then indicate positive or negative temperature differences and the degree of said temperature differences, will as usual be indicated from the extent of deviation of said line from said middle position.

As will be seen, by connecting a pressure operated recording or measuring instrument with the pressure fluid intake port, said instrument will be in a position directly to record or measure temperatures. In this manner the temperature measuring values can be converted into pressure values of any desired strength sufficient to operate any ordinary ink writer without difficulty. By means of the constant counter weight or force an electrical impulse of predetermined definite strength becomes necessary in order that the said pressure fluid intake port shall receive any pressure fluid at all. The recording or measuring instrument will therefore begin to function only when this limit is reached, that is to say applicant's invention enables a radiation pyrometer to be used for measuring or recording particular ranges of temperature only, the recording or measuring of all temperatures below those of the selected range being suppressed.

In the illustrative embodiment of the invention, the amount of pressure fluid received by the pressure fluid intake port is regulated or governed by movement of the jet nozzle relative thereto, but it will be apparent that any other suitable arrangement to this end may be used without departing from the spirit of the invention. The swinging nozzle responds to very low motive forces and very slight movements of said nozzle engender great changes in pressure in the conduits etc. with which said intake port communicates.

In the illustrative embodiment of the invention the electrical impulse delivered by the pyrometer or pyrometers is rendered effective by a coil movable in a magnetic field; but it will be apparent that any other suitable means to this end could be used without exceeding the scope of the invention. The particular arrangement herein disclosed has the advantage that slight current changes suffice to move the coil and to actuate the lever and jet nozzle.

I am aware that my present invention may be embodied in other specific forms from that herein described without departing from the spirit or essential attributes thereof, and I therefore desire the present embodiment of said invention to be considered in all respects as illustrative and not restrictive, reference being had to the appended claims rather than to the foregoing description to indicate the scope of the invention.

I claim:

1. Apparatus of the class described comprising, in combination, pyrometer means to deliver electrical impulses of varying strength responsive to temperature variations; two fluid pressure responsive means communicating with a pressure fluid intake port; a two-armed lever; a jet nozzle supplied with pressure fluid and carried by one arm of said lever; a coil in circuit with said pyrometer and carried by the other arm of said lever; a magnet, said coil being movable relative to the latter to move said lever upon its fulcrum and the discharge opening of said nozzle relative to said port to deliver to the latter more or less pressure fluid in response to variations in the strength of the electrical impulses delivered by said pyrometer; and means intermediate one of said fluid pressure responsive means and said nozzle whereby said fluid pressure responsive means tends to move said lever and the discharge opening of said nozzle relative to said port in opposition to the movement imparted thereto by said electrical impulses.

2. Apparatus of the character described comprising, in combination, a pyrometer; an electrical governing device including a magnetic coil connected to the pyrometer; a pivotally mounted fluid jet pipe connected to be controlled by said governing device and arranged to deliver pressure fluid to operate a measuring device; and an adjustable weight associated with said pivoted jet pipe to set the mechanism so that it will respond only after a predetermined minimum temperature is reached.

3. Apparatus of the class described comprising, in combination, pyrometer means including a thermocouple circuit; temperature indicating means; fluid pressure responsive means having an intake port communicating with said temperature indicating means; a two-armed lever carrying a jet nozzle supplied with fluid under constant pressure coacting with said intake port; a magnetic coil in said thermocouple circuit connected to said lever, said magnetic coil having a stationary magnet and being arranged to move said nozzle in one direction in response to current impulses created by said pyrometer and thereby adjust the nozzle relative to said intake port so as to deliver pressure fluid to said fluid pressure responsive means; and an adjustable weight on said lever for regulating said mechanism to prevent movement of said nozzle relative to the port until the temperature to which said pyrometer is subjected has reached a predetermined degree.

4. Apparatus of the character described comprising, in combination, two devices responsive to variations in temperature including thermoelectric circuits arranged to deliver actuating current impulses of correspondingly varying strength and acting in opposition to each other; means to supply fluid pressure to operate said apparatus; controlling means governed by the resultant of said current impulses; and means governed by fluid pressure supplied by said fluid pressure supplying means acting in opposition to said controlling means upon said fluid pressure supplying means in response to the resultant of the impulses, correspondingly to vary the amount of fluid pressure supplied.

5. Apparatus of the character described comprising, in combination, means responsive to changes in a physical condition connected to create electrical impulses which are directly proportional to said changes; a relay having a magnet and a magnetic coil movable in the magnetic field thereof and energized by said electrical impulses; a pivoted fluid jet tube connected to be operated by said magnetic coil; a conduit having a port into which said jet tube discharges whereby the pressure of the delivered fluid varies according to the position of said jet tube; and pressure responsive means operated by the pressure of the fluid in said conduit connected to counterbalance the action of said magnetic coil on said jet tube.

6. Apparatus of the character described comprising, in combination, means responsive to changes in a physical condition connected to create electrical impulses which are directly proportional to said changes; a relay having a magnet and a magnetic coil movable in the magnetic field thereof and energized by said electrical impulses; a pivoted fluid jet tube connected to be operated by said magnetic coil; a conduit having a port into which said jet tube discharges whereby the pressure of the delivered fluid varies according to the position of said jet tube; pressure responsive means operated by the pressure of the fluid in said conduit connected to counterbalance the action of said magnetic coil on said jet tube; and adjustable means associated with the jet tube to modify the pressure of the delivered fluid.

7. Apparatus of the character described comprising, in combination, means responsive to changes in a physical condition connected to create electrical impulses which are directly proportional to said changes; a relay having a magnet and a magnetic coil movable in the magnetic field thereof and energized by said electrical impulses; a pivoted fluid jet tube connected to be operated by said magnetic coil; a conduit having a port into which said jet tube discharges whereby the pressure of the delivered fluid varies according to the position of said jet tube; pressure responsive means operated by the pressure of the fluid in said conduit connected to counterbalance the action of said magnetic coil on said jet tube; and adjustable counterforce exerting means acting on the fluid jet tube to modify the pressure range created by said relay.

8. As an article of manufacture, a relay for converting electrical impulses into proportional fluid pressure controlling impulses; a magnet; a magnetic coil movable in the magnetic field thereof and adapted to be energized by the electrical impulses; a movable jet tube connected to be actuated by the magnetic coil; a conduit having a port into which said jet tube discharges whereby the pressure of the delivered fluid varies according to the position of said jet tube; and pressure responsive means operated by the pressure of said fluid in said conduit connected to counterbalance the action of said magnetic coil on said jet tube.

GUIDO WÜNSCH.